United States Patent [19]

Chujo et al.

[11] Patent Number: 5,718,200
[45] Date of Patent: Feb. 17, 1998

[54] ENGINE OUTPUT CONTROL SYSTEM

[75] Inventors: Keisuke Chujo, Yokohama; Yutaka Katabira; Naohito Katsura, both of Isehara, all of Japan

[73] Assignee: Nissan Motor Co., Ltd., Yokohama, Japan

[21] Appl. No.: 550,994

[22] Filed: Oct. 31, 1995

[30] Foreign Application Priority Data

Nov. 25, 1994 [JP] Japan ................. 6-291465

[51] Int. Cl.$^6$ ................. F02D 43/00; F25B 27/00
[52] U.S. Cl. ................. 123/339.16; 62/323.4; 180/69.3
[58] Field of Search ................. 123/339.16, 339.17, 123/339.18, 478, 480, 585; 62/323.4; 180/69.3; 364/431.7; 477/112, 113

[56] References Cited

U.S. PATENT DOCUMENTS

| | | | |
|---|---|---|---|
| 4,545,348 | 10/1985 | Ikeura | 123/339 |
| 4,556,942 | 12/1985 | Russo et al. | 364/431.7 |
| 4,582,032 | 4/1986 | Hara et al. | 123/339 |
| 4,721,082 | 1/1988 | Hibino et al. | 123/339 |
| 4,721,083 | 1/1988 | Hosaka | 123/339 |
| 4,736,720 | 4/1988 | Asakura et al. | 123/339 |
| 4,748,951 | 6/1988 | Manaka et al. | 123/339 |
| 4,766,862 | 8/1988 | Hibino et al. | 123/339 |

FOREIGN PATENT DOCUMENTS 3-276814  12/1991  Japan.

*Primary Examiner*—Andrew M. Dolinar
*Assistant Examiner*—Hieu T. Vo
*Attorney, Agent, or Firm*—Foley & Lardner

[57] ABSTRACT

In the presence of an operator's demand for sequential application of at least two of a plurality of loads to an internal combustion engine within a predetermined period of time, one of the two loads is applied to the engine after a predetermined time delay with respect to application of the other load to the engine. During the predetermined time delay, the engine output is increased to a level corresponding to the sum of the two loads produced upon simultaneous application of the two loads to the engine.

38 Claims, 6 Drawing Sheets

ENGINE OUTPUT CONTROL SYSTEM

BACKGROUND OF THE INVENTION

This invention relates to a control system for the control of an internal combustion engine installed on an automotive vehicle to provide an engine output corresponding to the load applied thereto.

It is the current practice to ensure stable engine rotation by controlling the engine output according to the load applied thereto during idle engine operation. The engine output control is made by increasing the amount of air introduced to the engine along with the amount of fuel delivered to the engine when the engine is a gasoline engine and merely by increasing the amount of fuel delivered to the engine when the engine is a diesel engine.

The engine will run with a great load applied thereto to operate an air conditioner. It is too late to start increasing the engine output upon actual application of the load to the engine. In order to avoid such a belated engine output control which may cause unstable engine rotation, it has been proposed in Japanese Patent Kokai No. 3-276814 to operate the air compressor after a predetermined delay with respect to the operator's operation of turning the air conditioner switch. During the predetermined delay, the engine is controlled to provide an output increase corresponding to the load applied to the engine when the air conditioner operates. However, this proposal is not satisfactory for two or more great loads applied in sequence to the engine in a short time. For example, if the power steering unit starts its operation after the air conditioner starts its operation in a time insufficient for the engine output to increase to an appropriate level corresponding to the sum of the loads applied to the engine upon the simultaneous operation of the air conditioner and the power steering unit, the engine speed would drop to a great extent causing the engine to stall.

SUMMARY OF THE INVENTION

It is a main object of the invention to provide an engine output control system which can ensure stable engine rotation upon sequential application of a plurality of loads in a short time to the engine.

There is provided, in accordance with the invention, a system for controlling an output produced from an internal combustion engine. The engine output control system comprises sensor means for sensing an operator's demand for sequential application of at least two of a plurality of loads to the engine within a predetermined period of time, application control means responsive to the sensed demand for applying one of the two loads to the engine after a predetermined time delay with respect to application of the other load to the engine, and output control means for increasing the engine output to a level within the predetermined time delay, the engine output level corresponding to the sum of the two loads produced upon simultaneous application of the two loads to the engine. It is, therefore, possible to ensure stable engine rotation upon sequential application of a plurality of loads in a short time to the engine.

The two loads may include first and second loads. In this case, the sensor means includes means for sensing an operator's demand for application of the first load to the engine, and means for sensing actual application of the second load to the engine. The application control means includes means for applying the first load to the engine after a predetermined time delay with respect to actual application of the second load to the engine. It is, therefore, possible to delay the application of the first load to the engine a predetermined time or more with respect to the application of the second load.

Preferably, the application control means includes means for interrupting the application of the first load to the engine when the second load is applied to the engine a predetermined time after the actual application of the first load to the engine, and means for resuming the application of the first load to the engine a predetermined time after the application of the first load to the engine is interrupted. It is, therefore, possible to delay the application of the first load to the engine a predetermined time or more with respect to the application of the second load.

Preferably, the application control means includes means for applying the first load to the engine after a predetermined time delay with respect to the sensed operator's demand for application of the first load to the engine; wherein the output control means includes means for controlling the engine output to produce an engine output increase corresponding to the first load during the predetermined time delay. The application control means includes means for elongating the predetermined time delay when the operator's demand for application of the first load to the engine is sensed within a predetermined time after the actual application of the second load to the engine is sensed, and means for applying the first load to the engine after the elongated time delay with respect to the actual application of the second load to the engine. The output control means includes means for controlling the engine output to produce an engine output increase corresponding to the sum of the first and second loads during the elongated time delay. It is, therefore, possible to increase the engine output to a level sufficient for the simultaneous application of the first and second loads to the engine so as to ensure stable engine operation.

Preferably, the application control means includes means for applying the first load to the engine after a predetermined time delay with respect to the sensed operator's demand for application of the first load to the engine. The output control means includes means for controlling the engine output to produce an engine output increase corresponding to the first load during the predetermined time delay. The application control means includes means for elongating the predetermined time delay when the actual application of the second load to the engine is sensed during the predetermined time delay, and means for applying the first load to the engine after the elongated time delay with respect to the sensed operator's demand for application of the first load to the engine. The output control means includes means for controlling the engine output to produce an engine output increase corresponding to the sum of the first and second loads during the elongated time delay. It is, therefore, possible to increase the engine output to a level sufficient for the simultaneous application of the first and second loads to the engine so as to ensure stable engine operation.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
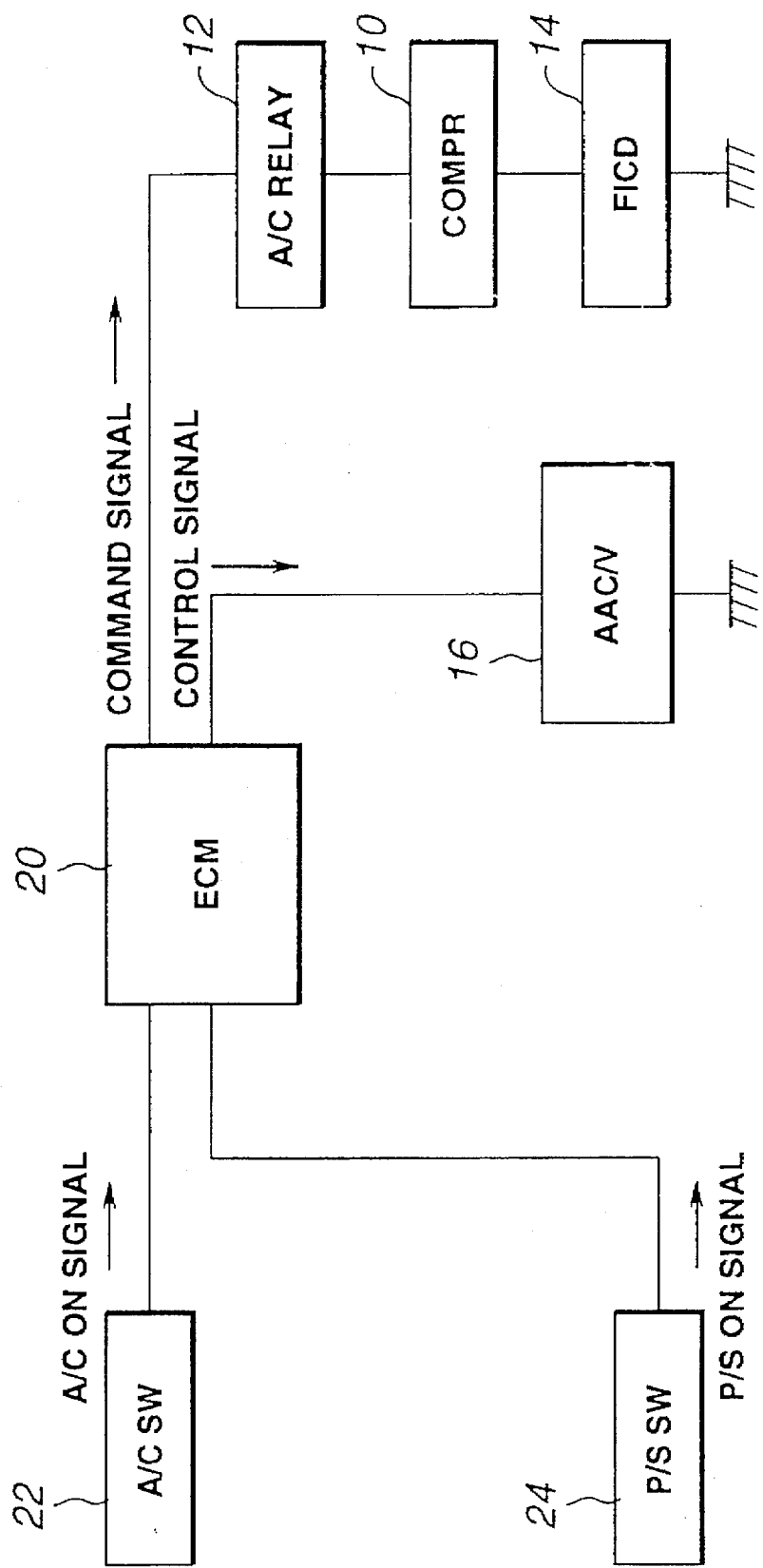
FIG. 1 is a schematic diagram showing one embodiment of an engine output control system made in accordance with the invention.

With reference to the drawings, and in particular to FIG. 1, there is shown a schematic diagram of an engine output control system embodying the invention. An internal combustion engine for an automotive vehicle is associated with a first load (in the illustrated case taken in the form of an air conditioner) and a second load (in the illustrated case taken in the form of a power steering unit). The air conditioner may be of the type including a compressor (COMPR) 10 which has a drive shaft coupled to the engine crankshaft through an electromagnetic clutch associated with an air conditioner (A/C) relay 12. The air conditioner relay 12 responds to a command signal fed thereto from a control unit 20 by changing to its ON position to engage the electromagnetic clutch so as to drive the compressor 10. The air conditioner relay 12 is connected in series with an electromagnetic fast idle control device (FICD) 14. The fast idle control device 14 includes a control valve provided in an auxiliary air passage bypassing the engine throttle valve for controlling the amount of air through the auxiliary air passage into the engine to adjust the engine speed when the engine is idling. The fast idle control device 14 receives the command signal fed thereto from the control unit 20 to increase the amount of air through the auxiliary air passage so as to increase the engine speed in a stepped fashion when the air conditioner relay 12 is at its ON position.

The control unit 20 also produces an air flow control signal to an idle control valve (AAC/V) 16. The idle control valve 16 is provided in another auxiliary air passage bypassing the engine throttle valve for controlling the amount of air through this auxiliary air passage into the engine to increase the engine speed to a target value when the engine is idling. The target value is determined as corresponding to the sum of the first and second loads applied to the engine.

The control unit 20 produces the command and control signals based on demands for application of the first and/or second loads to the engine. Thus, an air conditioner switch (A/C SW) 22 and a power steering switch (P/S SW) 24 are connected to the control unit 20. The air conditioner switch 12, which is changed to its ON position by the operator, produces an electric signal (A/C ON signal) indicative of an operator's demand of the air conditioner being operated. The power steering switch 24, which is changed to its ON position when the pressure of the oil fed from a hydraulic pump to drive the power steering unit exceeds a predetermined value, is used to provide an electric signal (P/S ON signal) indicative of an operator's demand of the power steering unit being driven.

It is now assumed that the switches 22 and 24 are turned ON in a sequential fashion during idle engine operation. When one of the switches 12 and 13 is turned ON in a time less than a predetermined value after the other switch is turned ON, the control unit 20 delays the time of simultaneous application of the first and second loads to the engine. Before both of the first and second loads are applied to the engine, the control unit 20 controls the idle control valve 16 to increase the engine speed to a target value corresponding to the simultaneous application of the first and second loads to the engine so as to ensure stable engine rotation. In practice, however, the control unit 20 is arranged to delay the instance at which the air conditioner is driven a predetermined time with respect to the operation of the power steering unit. The reason for this is that the power steering unit will operate before the control unit 20 receives the P/S ON signal from the power steering switch 24.

Figure 2:
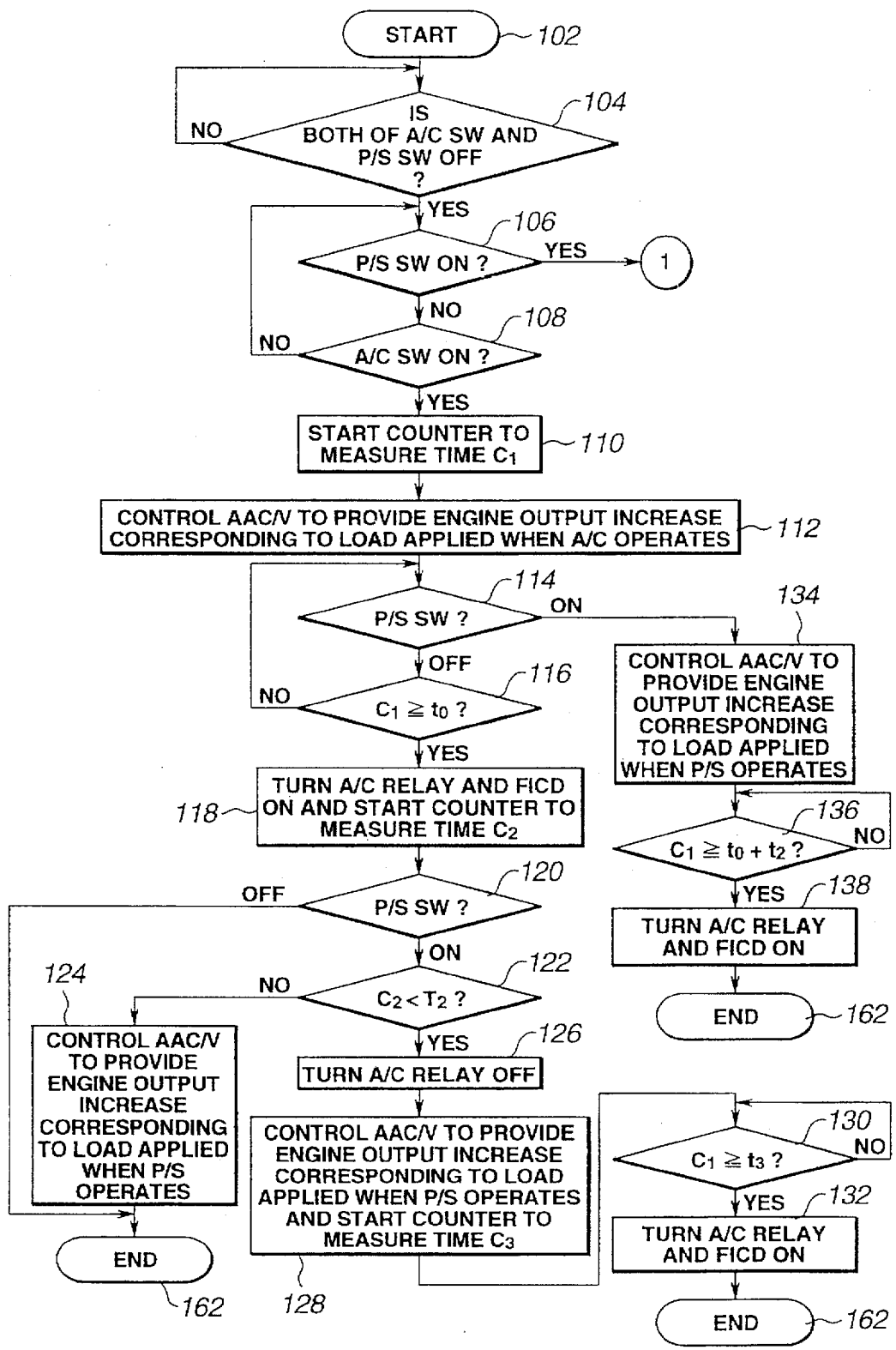
FIGS. 2 and 3 are flow diagrams showing the programming of the digital computer as it is used for engine output control.
Figure 3:
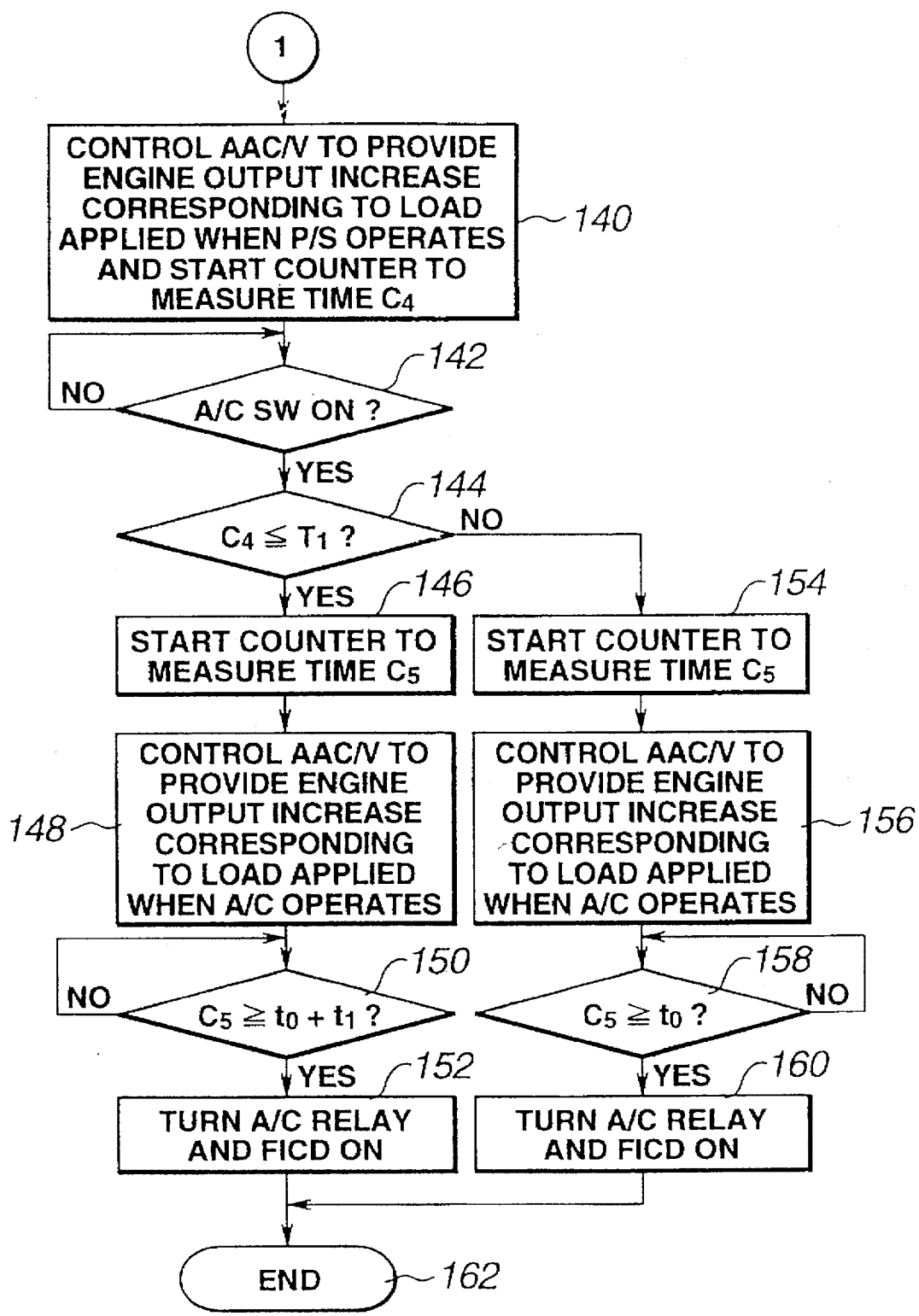

With reference to the flow diagram of FIGS. 2 and 3, the operation will be described further. The computer program is entered at the point 102. At the point 104 in the program, a determination is made as to whether or not both of the A/C and P/S switches 22 and 24 are OFF. If the answer to this question is "yes", then the program proceeds to the point 106. Otherwise, the program is returned to the point 104. At the point 106, a determination is made as to whether or not the P/S switch 24 is ON. If the answer to this question is "yes", then the program proceeds to the point 140. Otherwise, the program proceeds to another determination step at the point 108. This determination is as to whether or not the A/C switch 22 is ON. If the answer to this question is "yes", then the program is proceeds to the point 110. Otherwise, the program is returned to the point 106.

At the point 110 in the program, a command is produced to start a counter used in the control unit 20 to measure the time C1 elapsed after the A/C switch 22 is turned ON. At the point 112, a command is produced, causing the control unit 20 to output a control signal to the idle control valve 16 which thereby increases the air flow through the associated auxiliary air passage so as to provide an engine output increase corresponding to the load applied to the engine when the air conditioner is driven. At the point 114, a determination is made as to whether or not the P/S switch 24 is ON. If the answer to this question is "yes", then the program proceeds to the point 134. Otherwise, the program proceeds to another determination step at the point 116. This determination is as to whether or not the measured time C1 exceeds a predetermined value t0. If the answer to this question is "yes", then the program proceeds to the point 118 where a command is produced to start a counter used in the control unit 20 to measure the time C2 elapsed after the air conditioner starts its operation. At the same time, the control unit 20 produces a command signal to the A/C relay 12 which thereby causes the compressor 10 to be driven and also to the fast idle control device 14 which thereby increases the air flow through the associated auxiliary air passage in a stepped fashion so as to compensate for a greater load required at the start of operation of the air conditioner. Otherwise, the program is returned to the point 114. At the point 120 in the program, a determination is made as to whether or not the P/S switch 24 is ON. If the answer to this question is "no", then the program proceeds to the end point 162. If, the program proceeds to the end point 162.

Figure 4:
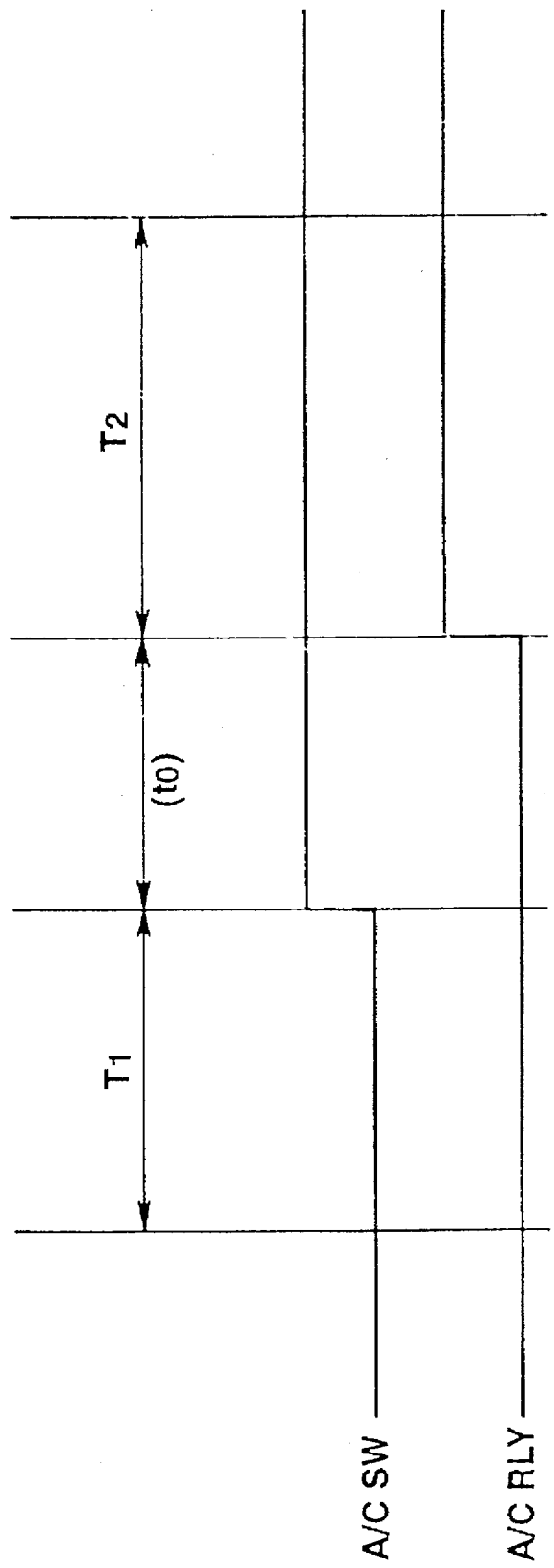
FIG. 4 is a timing diagram used to explain one mode of operation made in the engine output control system.

That is, when the A/C switch 22 is turned on with the P/S switch 24 held OFF, the A/C relay 12 receives a command signal from the control unit 20 to start the air conditioner after a predetermined t0, as shown in FIG. 4. During this delay t0, a control signal is applied to the idle control valve 16 which thereby increases the air flow through the associated auxiliary air passage so as to provide an engine output increase corresponding to the load applied to the engine when the air conditioner is driven.

If the answer to the question inputted at the point 120 is "yes", then the program proceeds to another determination step at the point 122. This determination is as to whether or not the measured time C2 is less than a predetermined value T2. If the answer to this question is "no", then it means that the time interval between the time at which the air conditioner starts its operation and the time at which the power steering unit starts its operation exceeds the predetermined value T2 and the program proceeds to the point 124 where a command is produced, causing the control unit 20 to output a control signal to the idle control valve 16 which thereby increases the air flow through the associated auxiliary air passage so as to provide an engine output increase corresponding to the load applied to the engine when the power steering unit is driven. Following this, the program proceeds to the end point.

If the answer to the question inputted at the point 122 is "yes", it means that the P/S switch 24 is turned on in a time shorter than the predetermined value T2 after the air conditioner starts its operation, that is, it means simultaneous application of both of the first and second loads to the engine within the predetermined period of time T2 and the program proceeds to the point 126 where a command is produced to interrupt the command signal to the A/C relay 12, causing the air conditioner to be stopped. Following this, the program proceeds to the point 128 where a command is produced to start a counter used in the control unit 20 to measure the time C3 elapsed after the air conditioner is stopped. At the same time, the control unit 20 produces a control signal to the idle control valve 16 which thereby increases the air flow through the associated auxiliary air passage so as to provide an engine output increase corresponding to the load applied to the engine when the power steering unit is driven. As a result, the engine outputs increases to a level corresponding to the sum of both of the first and second loads applied to the engine. At the point 130 in the program, a determination is made as to whether or not the measured time C3 exceeds a predetermined time t3. If the answer to this question is "yes", then the program proceeds to the point 132. Otherwise, the program is returned to the point 130. At the point 132, a command is produced to resume the application of the command signal to the A/C relay 12 which thereby restarts the air conditioner and also to the fast idle control device 14. Following this, the program proceeds to the end point 162.

Figure 5:
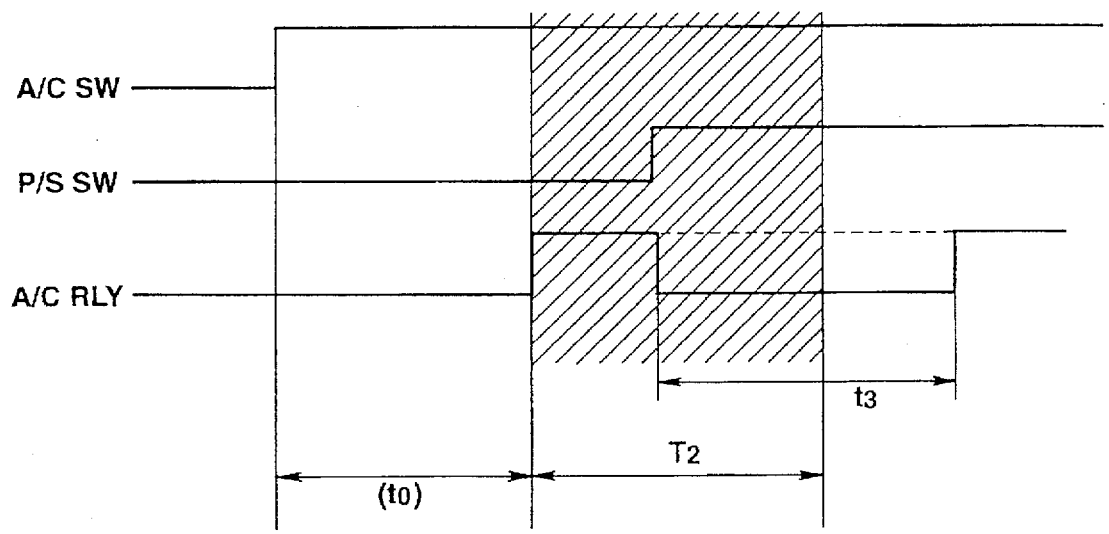
FIG. 5 is a timing diagram used to explain another mode of operation made in the engine output control system.

That is, when the power steering unit starts its operation with the P/S switch 24 being turned on in a time shorter than a predetermined time T2 after the A/C relay 12 receives a command signal from the control unit to start the air conditioner, the air conditioner is stopped to reduce the load applied to the engine and it is restarted after a predetermined time t3, as shown in FIG. 5. During the predetermined time t3, the control unit 20 produces a control signal to the idle control valve 16 which thereby increases the air flow through the associated auxiliary air passage so as to provide an engine output increase corresponding to the simultaneous application of the first and second loads to the engine. This is effective to ensure stable engine rotation.

If the answer to the question inputted at the point 114 is "yes", the program proceeds to the point 134 where a command is produced, causing the control unit 20 to output a control signal to the idle control valve 16 which thereby increases the air flow through the associated auxiliary air passage so as to provide an engine output increase corresponding to the load applied to the engine when the power steering unit is driven. At the point 136 in the program, a determination is made as to whether or not the measured time C1 is equal to or greater than the sum of the predetermined time t0 and a predetermined time t2. If the answer to this question is "yes", then the program proceeds to the point 138. Otherwise, the program is returned to the point 136. At the point 138, the control unit 20 produces a command signal to the A/C relay 12 which thereby causes the compressor 10 to be driven and also to the fast idle control device 14 which thereby increases the air flow through the associated auxiliary air passage in a stepped fashion so as to compensate for a greater load required at the start of operation of the air conditioner. Following this, the program proceeds to the end point 162.

Figure 6:
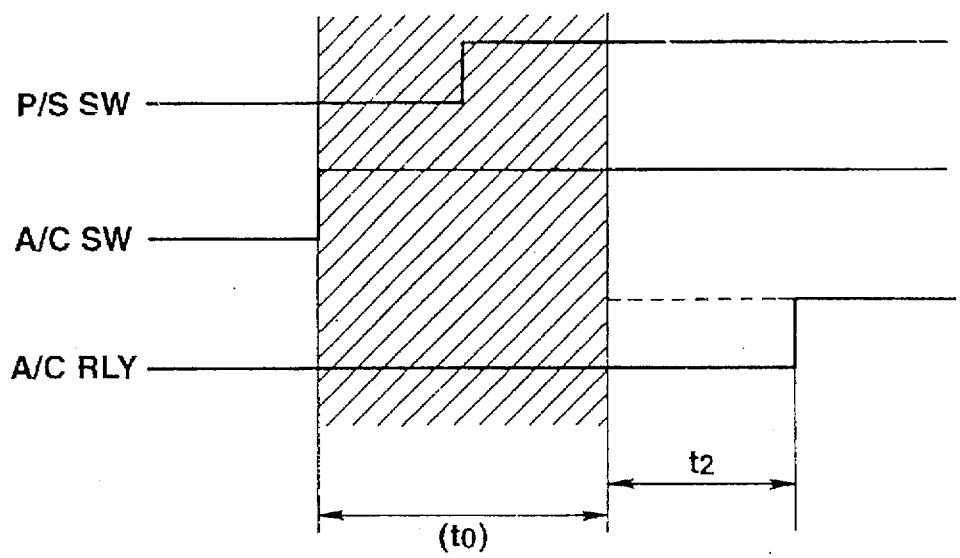
FIG. 6 is a timing diagram used to explain another mode of operation made in the engine output control system.

That is, when the P/S switch 24 is turned on during the predetermined delay t0 set for the operation. Of the air conditioner, the delay t0 is too short to increase the engine output to a level sufficient for simultaneous application of the first and second loads to the engine. For this reason, the control unit 20 produces the command signal to start the air conditioner after a delay of t0 plus t2, as shown in FIG. 6. This is effective to stable engine rotation upon simultaneous application of the first and second loads to the engine.

If the answer to the question inputted at the point 106 is "yes", then the program proceeds to the point 140 where a command is produced to start a counter used in the control unit 20 to measure the time C4 elapsed after the P/S switch 24 is turned ON. At the same time, control unit 20 produces a control signal to the idle control valve 16 which thereby increases the air flow through the associated auxiliary air passage so as to provide an engine output increase corresponding to the load applied to the engine when the power steering unit is driven. At the point 142 in the program, a determination is made as to whether or not the A/C switch 22 is ON. If the answer to this question is "yes", then the program proceeds to the point 144. Otherwise, the program is returned to the point 142. At the point 144, a determination is made as to whether or not the measured time C4 is equal to or less than a predetermined time T1. If the answer to this question is "yes", then the program proceeds to the point 146. Otherwise, the program proceeds to the point 154.

At the point 146 in the program, a command is produced to start a counter used in the control unit 20 to measure the time C5 elapsed after the A/C switch 22 is turned ON. At the point 148, the control unit 20 produces a control signal to the idle control valve 16 which thereby increases the air flow through the associated auxiliary air passage so as to provide an engine output increase corresponding to the load applied to the engine when the air conditioner is driven. At the point 150, a determination is made as to whether or not the measured time C5 is equal to or greater than the sum of the predetermined time t0 and a predetermined time t1. If the answer to this question is "yes", then the program proceeds to the point 152. Otherwise, the program is returned to the point 150. At the point 152, the control unit 20 produces a command signal to the A/C relay 12 which thereby causes the compressor 10 to be driven and also to the fast idle control devise 14 which thereby increases the air flow through the associated auxiliary air passage. Following this, the program proceeds to the end point 162.

Figure 7:
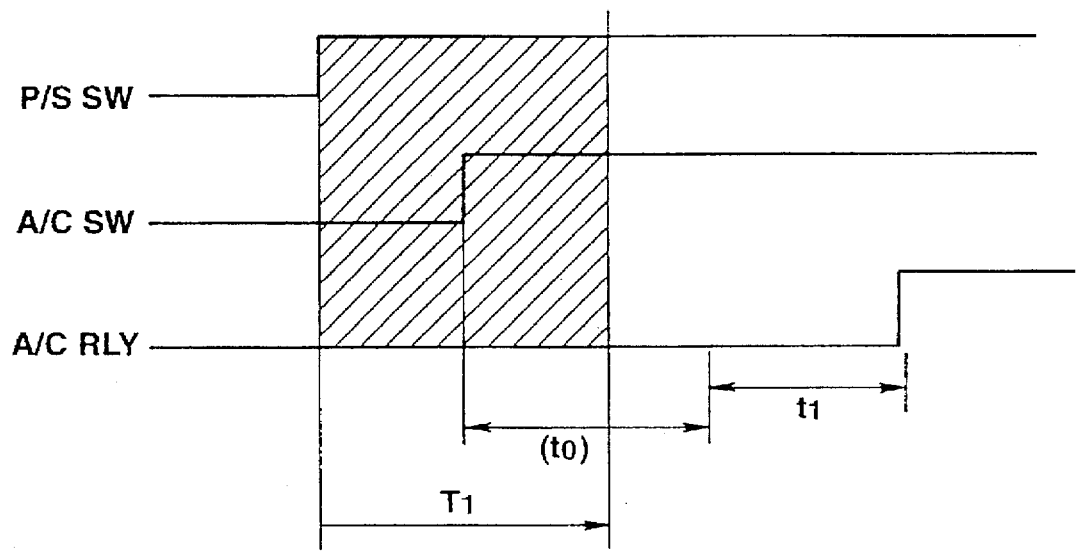
FIG. 7 is a timing diagram used to explain still another mode of operation made in the engine output control system.

That is, when the A/C switch 22 is turned on in a time shorter than the predetermined time T1 after the P/S switch 24 is turned ON, the predetermined delay t0 set for the operation of the air conditioner is too short to increase the engine output to a level sufficient for simultaneous application of the first and second loads to the engine. For this reason, the control unit 20 produces the command signal to start the air conditioner after a delay of t0 plus t1, as shown in FIG. 7. This is effective to stable engine rotation upon simultaneous application of the first and second loads to the engine.

At the point 154 in the program, a command is produced to start the counter used in the control unit 20 to measure the time C5 elapsed after the A/C switch 22 is turned ON. At the point 156, the control unit 20 produces a control signal to the idle control valve 16 which thereby increases the air flow through the associated auxiliary air passage so as to provide an engine output increase corresponding to the load applied to the engine when the air conditioner is driven. At the point 158, a determination is made as to whether or not the measured time C5 is equal to or greater than the predetermined time t0. If the answer to this question is "yes", then the program proceeds to the point 160. Otherwise, the program is returned to the point 158. At the point 160, the control unit 20 produces a command signal to the A/C relay 12 which thereby causes the compressor 10 to be driven and also to the fast idle control device 14 which thereby increases the air flow through the associated auxiliary air passage. Following this, the program proceeds to the end point 162.

That is, when the A/C switch 22 is turned ON in a time longer than the predetermined time T1 after the P/S switch 24 is turned ON, the predetermined delay t0 set for the operation of the air conditioner is sufficient to increase the engine output to a level sufficient for simultaneous application of the first and second loads to the engine. For this reason, the control unit 20 produces the command signal to start the air conditioner after a delay of t0.

Although the invention has been described in connection with a gasoline engine, it is to be noted, of course, that the invention is equally applicable to diesel engines. It is the current practice in the field of diesel engines to increase the engine output by increasing the amount of fuel delivered to the engine during idle engine operation. Although the invention has a great effect to ensure stable engine operation for simultaneous application of a plurality of loads to the engine during idle engine operation, it is to be noted that the invention has a similar effect for other engine operating conditions such as low-speed, low-load conditions. In this embodiment, the second load is taken in the form of a power steering unit. The time at which the second load is applied to the engine cannot be controlled. Such a second load may be taken in the form of a great electric load applied when an electric device operates on power from a car battery, a load applied when the automatic transmission is changed from its neutral range to its drive range or the like.

What is claimed is:

1. A system for controlling an output produced from an internal combustion engine, comprising:
   sensor means which, upon sensing a demand for sequential application of at least two loads to the engine within a predetermined period of time, generates a first signal;
   application control means which, upon receiving the first signal, applies one of the two loads to the engine a predetermined time after application of the other load to the engine; and
   output control means for increasing the engine output to a predetermined level within the predetermined time, the predetermined level corresponding to a sum of the two loads demanded from the engine.

2. The engine output control system as claimed in claim 1, wherein the output control means controls at least one of an amount of air introduced to the engine and an amount of fuel delivered to the engine.

3. The engine output control system as claimed in claim 1, wherein the output control means controls the engine output during idle engine operation.

4. The engine output control system as claimed in claim 1, wherein the two loads include first and second loads, and wherein the sensor means further includes means for sensing a demand for application of the first load to the engine, and means for sensing application of the second load to the engine.

5. The engine output control system as claimed in claim 4, wherein the application control means includes means for applying the first load to the engine the predetermined time after the sensed demand for application of the first load to the engine;
   wherein the output control means includes means for increasing the engine output corresponding to the first load during the predetermined time;
   wherein the application control means further includes means for extending the predetermined time when the demand for application of the first load to the engine is sensed within the predetermined time after application of the second load to the engine, and means for applying the first load to the engine after the extended predetermined time and
   wherein the output control means further includes means for increasing the engine output corresponding to the sum of the first and second loads during the extended predetermined time.

6. The engine output control system as claimed in claim 4, wherein the application control means includes means for applying the first load to the engine the predetermined time after the sensed demand for application of the first load to the engine;
   wherein the output control means includes means for increasing the engine output corresponding to the first load during the predetermined time;
   wherein the application control means further includes means for extending the predetermined time when application of the second load to the engine is sensed during the predetermined time, and means for applying the first load to the engine after the extended predetermined time; and
   wherein the output control means further includes means for increasing the engine output corresponding to the sum of the first and second loads during the extended predetermined time.

7. The engine output control system as claimed in claim 4, wherein the first load is applied to the engine when an air conditioner operates and the second load is applied to the engine when a power steering unit operates.

8. The engine output control system as claimed in claim 4, wherein the first load is applied to the engine when an air conditioner operates and the second load is applied to the engine when another electric device operates.

9. The engine output control system as claimed in claim 4, wherein the first load is applied to the engine when an air conditioner operates and the second load is applied to the engine when an automatic transmission is changed from a neutral range to a drive range.

10. The engine output control system as claimed in claim 4, wherein the output control means is operable to control at least one of an amount of air introduced to the engine and an amount of fuel delivered to the engine.

11. The engine output control system as claimed in claim 4, wherein the output control means is operable to control the engine output during idle engine operation.

12. The engine output control system as claimed in claim 4, wherein the application control means further includes means for interrupting application of the first load to the engine when the second load is applied to the engine within the predetermined time after application of the first load to the engine, and means for resuming application of the first load to the engine the predetermined time after application of the first load to the engine is interrupted.

13. The engine output control system as claimed in claim 12, wherein the application control means includes means for applying the first load to the engine the predetermined time after the sensed demand for application of the first load to the engine;
- wherein the output control means includes means for increasing the engine output corresponding to the first load during the predetermined time;
- wherein the application control means further includes means for extending the predetermined time when application of the second load to the engine is sensed during the predetermined time, and means for applying the first load to the engine after the extended time; and
- wherein the output control means further includes means for increasing the engine output corresponding to the sum of the first and second loads during the extended predetermined.

14. The engine output control system as claimed in claim 12, wherein the first load is applied to the engine when an air conditioner operates and the second load is applied to the engine when a power steering unit operates.

15. The engine output control system as claimed in claim 12, wherein the first load is applied to the engine when an air conditioner operates and the second load is applied to the engine when another electric device operates.

16. The engine output control system as claimed in claim 12, wherein the first load is applied to the engine when an air conditioner operates and the second load is applied to the engine when an automatic transmission is changed from a neutral range to a drive range.

17. The engine output control system as claimed in claim 12, wherein the output control means is operable to control at least one of an amount of air introduced to the engine and an amount of fuel delivered to the engine.

18. The engine output control system as claimed in claim 12, wherein the output control means is operable to control the engine output during idle engine operation.

19. The engine output control system as claimed in claim 12, wherein the application control means includes means for applying the first load to the engine the predetermined time after the sensed demand for application of the first load to the engine;
- wherein the output control means includes means for increasing the engine output corresponding to the first load during the predetermined time;
- wherein the application control means further includes means for extending the predetermined time when the demand for application of the first load to the engine is sensed within a predetermined time after application of the second load to the engine is sensed, and means for applying the first load to the engine after the extended predetermined time; and
- wherein the output control means further includes means for increasing the engine output corresponding to the sum of the first and second loads during the extended predetermined time.

20. The engine output control system as claimed in claim 19, wherein the first load is applied to the engine when an air conditioner operates and the second load is applied to the engine when a power steering unit operates.

21. The engine output control system as claimed in claim 19, wherein the first load is applied to the engine when an air conditioner operates and the second load is applied to the engine when another electric device operates.

22. The engine output control system as claimed in claim 19, wherein the first load is applied to the engine when an air conditioner operates and the second load is applied to the engine when an automatic transmission is changed from a neutral range to a drive range.

23. The engine output control system as claimed in claim 19, wherein the output control means is operable to control at least one of an amount of air introduced to the engine and an amount of fuel delivered to the engine.

24. The engine output control system as claimed in claim 19, wherein the output control means is operable to control the engine output during idle engine operation.

25. The engine output control system as claimed in claim 19, wherein the application control means includes means for applying the first load to the engine the predetermined time after the sensed demand for application of the first load to the engine;
- wherein the output control means includes means for increasing the engine output corresponding to the first load during the predetermined time;
- wherein the application control means further includes means for extending the predetermined time when application of the second load to the engine is sensed during the predetermined time, and means for applying the first load to the engine after the extended predetermined time; and
- wherein the output control means further includes means for increasing the engine output corresponding to the sum of the first and second loads during the extended predetermined time.

26. The engine output control system as claimed in claim 25, wherein the first load is applied to the engine when an air conditioner operates and the second load is applied to the engine when another electric device operates.

27. The engine output control system as claimed in claim 25, wherein the first load is applied to the engine when an air conditioner operates and the second load is applied to the engine when an automatic transmission is changed from a neutral range to a drive range.

28. The engine output control system as claimed in claim 25, wherein the output control means is operable to control at least one of an amount of air introduced to the engine and an amount of fuel delivered to the engine.

29. The engine output control system as claimed in claim 25, wherein the output control means is operable to control the engine output during idle engine operation.

30. The engine output control system as claimed in claim 25, wherein the first load is applied to the engine when an air conditioner operates and the second load is applied to the engine when a power steering unit operates.

31. The engine output control system as claimed claim 30, wherein the output control means is operable to control the engine output during idle engine operation.

32. The engine output control system as claimed in claim 30, wherein the output control means is operable to control at least one of an amount of air introduced to the engine and an amount of fuel delivered to the engine.

33. The engine output control system as claimed in claim 32, wherein the output control means is operable to control the engine output during idle engine operation.

34. A system for controlling an internal combustion engine when first and second loads are applied to the engine, comprising:
- a first sensor for sensing a demand for a first load to the engine and generating a first command signal;
- a second sensor for sensing a demand for a second load to the engine and generating a second command signal;

a control unit which, upon determining that the first and second command signals are generated within a predetermined period of time, generates a third command signal and control signals;

a first application control means which, upon receiving the third command signal, delays application of the first load for a predetermined time with respect to the application of the second load; and a second application control means which, upon receiving the control signals, increases the engine output during the predetermined time to ensure a stable operative condition of the engine.

35. The engine output control system as claimed in claim 34, wherein application of the first load is delayed by a preset time each time a demand therefore is generated, whereas the second load is applied immediately upon demand therefore; and wherein said preset time is extended to the predetermined time when the first and second loads are demanded within the predetermined period of time.

36. The engine output control system as claimed in claim 34, wherein the predetermined period of time is based on the first load or the second load, whichever is demanded first.

37. The engine output control system as claimed in claim 36, wherein the first load is applied to the engine when an air conditioner is engaged, and the second load is applied to the engine when one of a power steering unit, a headlamp or a defogger is engaged.

38. A method for controlling output of an internal combustion engine when first and second loads are applied thereto, comprising the steps of:

sensing a demand for a first load to the engine;

sensing a demand for a second load to the engine within a predetermined time period from sensing the demand for the first load;

selectively applying one of the first and second loads to the engine while preventing the other of the first and second loads from being applied to the engine for a predetermined time; and applying the other of the first and second loads to the engine after the predetermined time.

\* \* \* \* \*